Patented Jan. 21, 1930

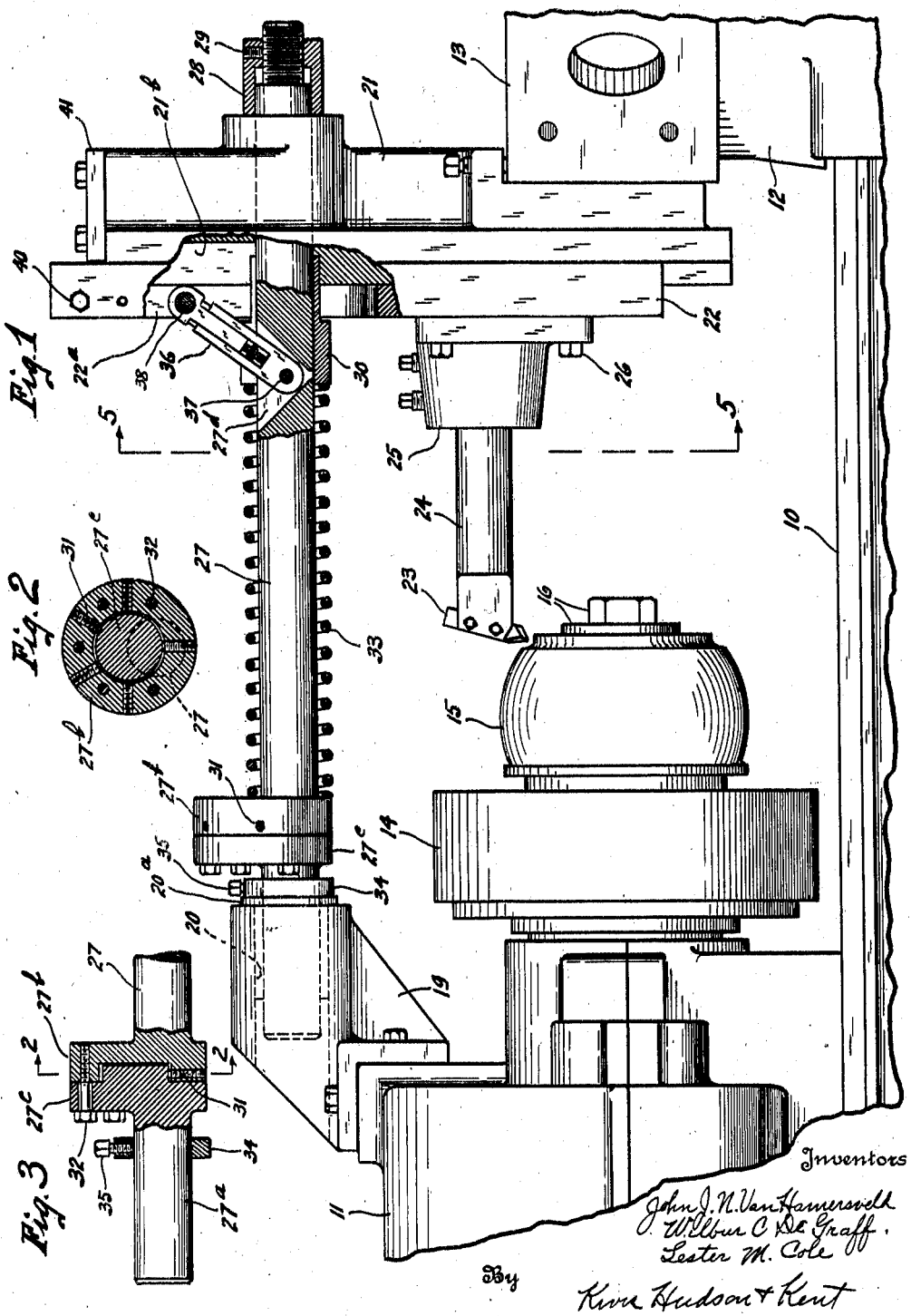

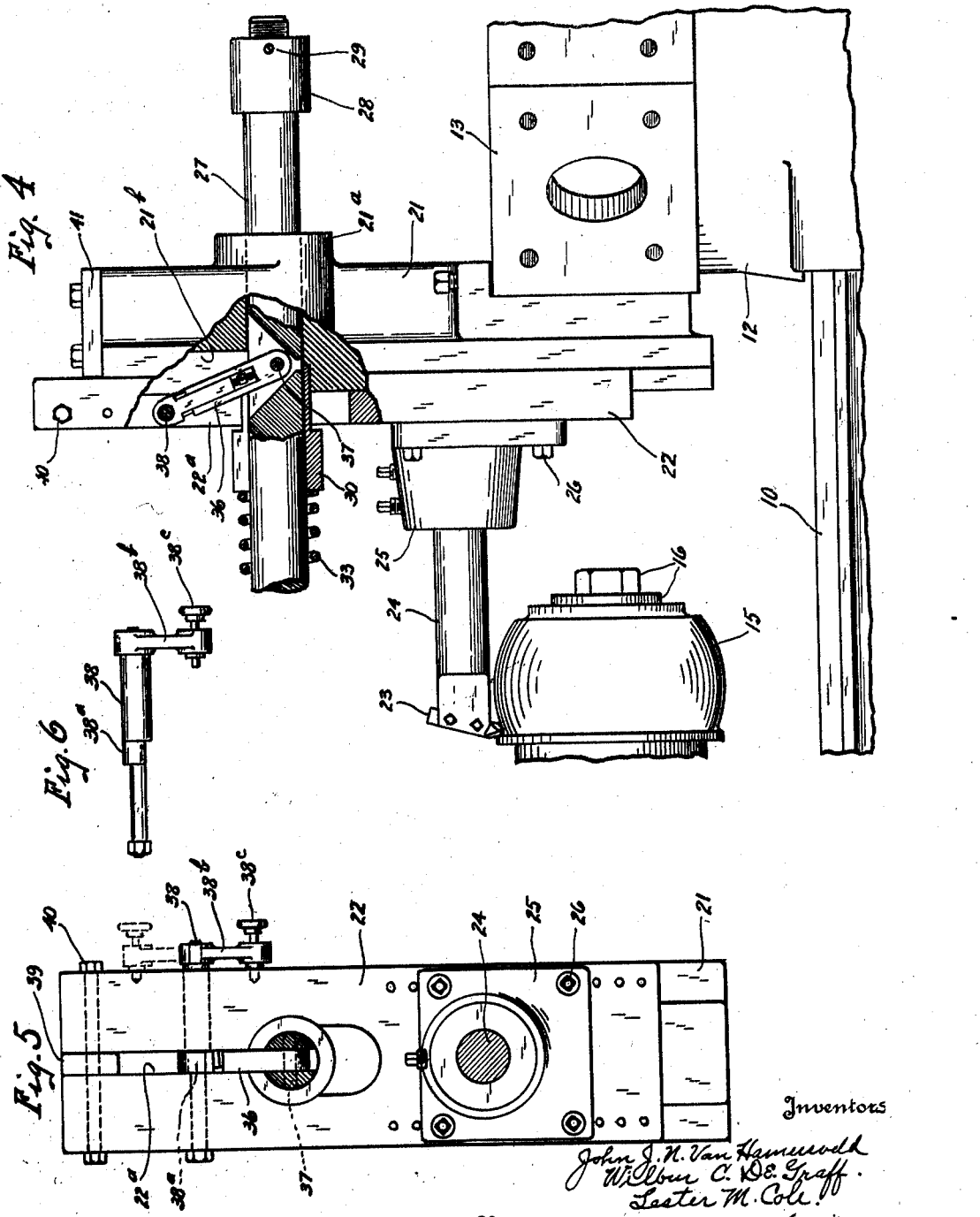

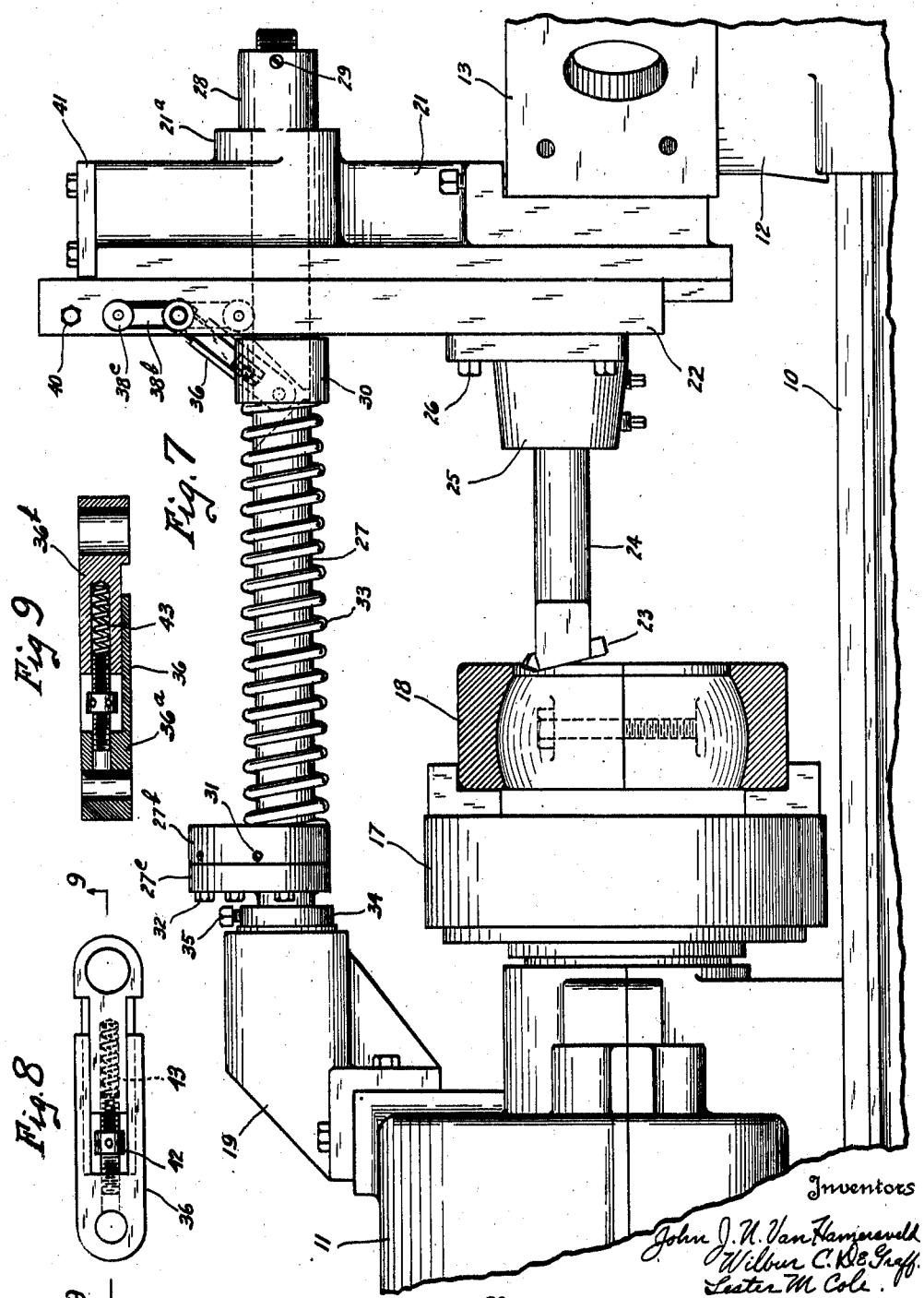

1,744,252

UNITED STATES PATENT OFFICE

JOHN J. N. VAN HAMERSVELD, OF CLEVELAND HEIGHTS, WILBUR C. DE GRAFF, OF CLEVELAND, AND LESTER M. COLE, OF CLEVELAND HEIGHTS, OHIO, ASSIGNORS TO THE WARNER & SWASEY COMPANY, OF CLEVELAND, OHIO, A CORPORATION OF OHIO

ATTACHMENT FOR MACHINE TOOLS FOR TURNING AND BORING SPHERICAL SURFACES

Application filed November 5, 1927. Serial No. 231,258.

This invention relates to a machine tool for turning or boring spherical surfaces and has for its chief object the provision of a tool having the features of simplicity, durability, accuracy in results, smoothness and facility of operation, adaptability for work pieces of different sizes, and readiness with which the machine tool may be changed from the turning to the boring set-up and vice versa.

Further, the invention aims to accomplish the above objects with a device in the form of an attachment for machine tools such as lathes.

A further object is to provide for certain adjustments in the part which controls the radius of the spherical surface which is to be machined on the work piece and thus enable surfaces of varying radii to be machined.

A still further object is to provide means whereby the tool may be readily relieved from the work at the end of the turning or boring operation so as to avoid scoring the work when the tool is retracted.

The above and other objects are attained by the invention which may be here briefly summarized as consisting in certain novel details of construction and combinations and arrangements of parts which will be described in the specification and set forth in the appended claims.

In the accompanying sheets of drawings, Fig. 1 is a side elevation showing the main parts of the lathe to which my improved attachment is applied, parts being in section; Fig. 2 is a detail sectional view substantially along the line 2—2 of Fig. 3; Fig. 3 is a fragmentary detail view, partly in section, of a bar forming a part of the attachment; Fig. 4 is a view similar to Fig. 1 but omitting the head and the work supporting chuck, showing the parts in the relative positions which they occupy when the tool is at or at substantially the end of the cut; Fig. 5 is a transverse sectional view substantially along the line 5—5 of Fig. 1; Fig. 6 is a detached detail view of the rotatable eccentric bearing for a link used in the construction; Fig. 7 is a view similar to Fig. 1 but showing the attachment arranged for boring the spherical surface instead of the turning operation as in Figs. 1 and 4; Fig. 8 is an elevation on an enlarged scale of an adjustable link which may be employed in the construction; and Fig. 9 is a sectional view of the link along the line 9—9 of Fig. 8.

The invention may be embodied in a special machine adapted for the purpose of turning or boring spherical surfaces, but it is preferably in the form of an attachment adapted to be applied to the head and main slide of a lathe such as a turret lathe, and that form or embodiment of the invention is illustrated in the drawings, wherein 10 represents the bed of the lathe, 11 the head and 12 the turret slide having the usual turret 13. The head is provided with the usual spindle (not shown) to which is adapted to be applied a suitable chuck or adapter for supporting the work piece. The form of chuck or adapter will depend upon whether the work piece is to have a spherical surface turned thereon or a spherical surface bored therein. In Figs. 1 and 4 which show the machine adapted for turning a spherical surface, externally of the work piece, the spindle is provided with an adapter 14 which supports the work piece 15 which is held in position by a nut and washer 16. In Fig. 7, which shows the attachment adapted for boring a spherical surface, the spindle is provided with a suitable chuck 17 having jaws which engage the work piece 18.

When the invention is in the form of an attachment, as herein illustrated, it includes parts which are attached both to the head 11 and the turret 13. The part attached to the head consists of a bracket 19, the upper portion of which is provided with an opening extending therethrough, into which opening is adapted to extend one end of a bar to be referred to presently. Fitted into the opening is a bushing 20 with which the bar has sliding engagement, see Fig. 1, the bushing being provided at its forward end with a flange 20ª serving as a stop, as will be explained.

The part which is attached to the turret includes a tool supporting bracket 21 which is secured to one face and to the top of the turret in any suitable way. This bracket is provided with undercut ways for a tool holding slide 22 which is adapted to move in a plane at right angles to the axis of the machine. The tool 23, which may be used for both turning and boring, is in this instance secured to a bar 24 removably secured to a tool holder 25 which is adapted to be secured in adjusted position on the front face of the slide 22. The latter is provided with a series of threaded openings by which the tool holder 25 may be secured at a suitable elevation on the slide by means of screws 26 or equivalent securing means. The point at which the holder is secured to the slide depends upon whether the attachment is to be used for boring or turning and also upon the diameter or size of the work piece, the spacing of the screw holes in the slide and the adjustability of the tool 23 in the bar 24 together adapting the attachment for turning or boring surfaces of any diameter within the limits for which the attachment is designed.

Extending through the slide and slidingly supported in the bracket 21 is a bar 27 which has a range of sliding movement, the forward and rear limits of which are indicated in Figs. 1 to 4, Fig. 1 showing the bar in its forwardmost position and Fig. 4 showing the bar in its rearmost position, the limit of the forward movement being determined by an adjustable stop 28 which is screwed onto the rear portion of the bar and is held in position by a lock screw 29. This stop is in the form of a threaded sleeve, the forward end of which is adapted to engage the rear face of a boss 21ᵃ formed on the rear side of the bracket 21. At the front side of the bracket and projecting forwardly therefrom is a bushing 30 through which the bar is adapted to slide in its forward and rearward movements.

This bar is preferably formed in two portions, there being adjustably secured to the front end an extension 27ᵃ, this being the part which is adapted to slidingly engage the bushing 20 of the bracket 19 secured to the head in the forward travel of the bar as the turret moves toward the head just prior to the turning or boring operation. The main part of the bar and the extension 27ᵃ are made adjustable so as to obtain the desired smoothness of operation and accuracy, and to compensate for any slight misalignment between the bushing 30 carried by the bracket 21, the hole in the bracket in which the bar is adapted to slide, and the bushing 20 carried by the bracket 19. To permit this adjustment to be made readily and to enable the two parts to be tightly secured in their relative adjusted positions, the body of the bar and its extension are provided with complementary flanged portions 27ᵇ and 27ᶜ with interfitting portions which will enable the two parts to be centered or to be relatively positioned out of alignment, if necessary, by a series of radially disposed set-screws 31. After the parts have been relatively adjusted, they are tightly secured in position by a series of axially disposed screws 32 passing through slightly enlarged openings in one flange and having threaded engagement with the other.

Between the forward end of the bushing 30 which, as before stated, is carried by bracket 21 and the enlargement 27ᵇ at the forward end of the body of bar 27, there is a coil spring 33 which normally tends to hold the bar in its forwardmost position with respect to the bracket 21. On the extension 27ᵃ of the bar there is provided a stop 34 in the form of a ring or collar which can be secured to the extension at any desired point by means of a set-screw 35 or equivalent means. It will be obvious that if the turret with the parts supported by it are moved toward the head the extension 27ᵃ of the bar will enter the bushing 20 of the bracket 19, and as soon as the stop 34 engages the flange 20ᵃ of the bushing 20 the movement of the bar is arrested so that during the balance of the forward movement of the turret the spring 33 will be compressed and the bracket will slide forwardly on the now stationary bar 27. This relative movement between the bracket and the bar while the latter is held stationary, as just described, is utilized in imparting outward and inward movements to the tool slide so that the spherical surface will be turned or bored on the work piece.

For the purpose of transmitting movement between the bar and the slide, we employ a link 36 which is pivoted by means of a pin 37 to the bar, the latter having an opening or slot 27ᵈ cut therein to provide free movement for the link. At its upper end the link 36 is pivoted to the slide and preferably there is used for this purpose an adjustable bearing pin 38, see particularly Fig. 6, which pin extends through the slide from one edge to the other and is provided between its bearing ends with an eccentric portion 38ᵃ which the upper end of the link engages. This pin is provided at its front end at the front edge of the slide with an arm or crank portion 38ᵇ and passing through the free end thereof is a pull pin 38ᶜ which can be inserted in either of two openings, one above and one below the pin so that when the pull pin is extracted from one opening the bearing pin may be turned through an arc of 180° whereupon the pull pin is re-inserted so as to vary by 180° the position of the eccentric portion 38ᵃ. It might be here stated that this is provided to enable the tool to be withdrawn or relieved from the work piece so as to avoid scoring of the latter when the tool is retracted after the turning or boring cut has been completed.

The link 36 is supported by the pin 38 so that it may swing in a slot 22ᵃ formed in the upper part of the slide (note particularly Fig. 5). It might be here stated that the front face of the bracket 21 is provided with a groove 21$^b$ to provide clearance for the rearward swinging movement of the link as indicated in Fig. 4, and that the bushing 30 is slotted to allow free movement of the link, Figs. 1 and 4 showing substantially the extreme positions of the link. The slot 22$^a$ in the slide near its lower portion is enlarged to form a suitable clearance for the rear portion of the bushing 30 which slidingly receives the bar 27. At its upper end this slot 22$^a$ is closed by a filler block 39, the forked top of the slide and this intermediate filler block being clamped together by a bolt 40 for the sake of rigidity. At the top of the bracket 21 and serving to close the groove 21$^b$ formed therein is a closure plate 41 suitably secured in position.

It will be seen that in the forward travel of the turret as soon as the stop collar 34 engages the bushing 20 in the bracket 19 the forward movement of the bar 27 is arrested and as the pivot pin 37 at the lower end of the link becomes stationary further forward movement of the turret and therefore of the bracket 21 and the slide 22 will cause the link 36 to swing about the lower pivot pin 37, imparting an upward or outer movement to the slide until after the link passes its vertical position and then an inward movement until the forward movement of the turret is stopped. When this movement is imparted to the slide, a spherical surface is cut on the work piece, this being an external surface if the tool is arranged for turning, as in Fig. 1, and an internal surface if arranged for boring, as in Fig. 7. In either event, the radius of a surface cut on the work piece is equal precisely to the length of the link between its pivot centers. Furthermore, when the tool is used for boring, the bored surface is an exact counterpart of the turned surface, assuming that the start and finish of the swinging movement of the link is the same in both instances. It might be here stated that the point in the forward travel of the turret at which swinging movement of the link begins is determined by the position at which the stop collar 34 is secured to the extension of the bar 27.

When the cut of the spherical surface is finished, as when the tool reaches the position indicated in Fig. 4, the forward travel of the turret is stopped, as by manually or automatically throwing out the feed of the turret slide, and then when the turret is retracted, the same but reversed motions are given to all of the parts. If the tool is not relieved from the work prior to the return movement of the turret slide, the work is likely to be scored. To obviate this, we provide the special pivot pin 38 for the upper end of the link. At the completion of the cut, therefore, the operator swings the crank 38$^b$ of the pivot pin 38 through an arc of 180° or from the position shown by full lines in Fig. 5 to the position shown in dotted lines therein. This moves the eccentric portion 38$^a$ from its upward position to its lowermost position slightly elevating the slide and thus withdrawing the tool from the work piece. This is the case when the attachment has been arranged for turning.

For the boring operation indicated in Fig. 7, the position of the tool holder is reversed with respect to its position in Fig. 1, and during the boring operation the crank 38$^b$ occupies its uppermost or full line position shown in Fig. 7 and to relieve the tool from the work it is thrown from its upper position to its lower position shown by dotted lines in this same figure. This moves the eccentric portion of the pin from its lowermost position to its uppermost position, causing the slide to be lowered and thus lowering the tool from the spherical bored surface so that the tool may be retracted without danger of scoring the work. Before bringing the tool forward again for the next cutting operation, the operator will restore the crank 38$^b$ to its former position, thus properly positioning the tool for its next cutting operation.

It was previously stated that the radius of curvature of the turned or bored spherical surface is equal to the distance between the centers of the pivot pins at the two ends of the link. Therefore, if the length of the link between its bearing portions is varied it is obvious that the radius of curvature of the cut surface will be correspondingly varied. We prefer to make the link adjustable, as shown in detail in Figs. 8 and 9, wherein the link is shown as composed of two sliding parts 36$^a$ and 36$^b$, one part having an undercut slot receiving the dovetailed portion of the other. The link may be lengthened or shortened by an adjusting screw 42 having right and left-hand threaded portions engaging in correspondingly threaded portions of the two parts of the link, the threads being preferably of a very fine pitch to allow very fine adjustment and also so as not to be affected by vibration. The screw 42 may be held from accidental turning in any suitable way, but we find that this can be accomplished, in view of the fine pitch thread which is employed, simply by arranging in one of the halves of the link a spring 43 which bears against one end of the screw. This applies sufficient pressure onto the end of the screw to lock it against movement.

With this arrangement, a given range of adjustment can be given to the length of the link between the centers of the bearing openings so that spherical surfaces having a great variety of radii can be cut on different work pieces. This makes it possible to cut spherical surfaces on practically an infinite number of radii within certain given limits met in practice with the use of very few links of different lengths, each link being adjustable and covering a certain part of that range.

It will be apparent that the attachment can be very readily applied to a standard form of lathe and also that there is special utility in applying it to a turret lathe for with this type of lathe it is possible to attach to another face of the turret a duplicate of that which in the drawings is shown as attached to one face, in which event one unit will be applied to the head and two units to different faces of the turret, one of the last named being employed for forming the roughing cut and the other for the finishing cut. The roughing cut can be made rapidly with a coarse feed and the finishing cut more slowly with a relatively fine feed, thus completing the work piece in one setting. Additionally, other tools for end facing or other machining operations may be mounted on the turret or on the usual cross slide of the lathe.

It will be seen from the above that the objects stated at the beginning of the specification are attained by this attachment in a very effective manner. While we have described the preferred construction and that in the form of an attachment, we do not desire to be confined to the details of the attachment nor to the fact that the invention is in the form of an attachment for, as already stated, it may be embodied in parts forming permanent portions of a machine tool designed for this particular purpose.

Having thus described our invention, we claim:

1. In a machine tool for turning or boring spherical surfaces, a work holding member and a tool holding member one movable toward and from the other, a movable tool support carried by the tool holding member, a bar carried by one of said members and adapted to have sliding engagement with the other so as to obtain a piloting effect and adapted to be stopped in its movement, and a movement transmitting connection between the bar and the movable tool support.

2. In a machine tool for boring or turning spherical surfaces, a work holding member and a tool holding member, one movable toward and from the other and each having an extension, a tool supporting member carried by the extension of the tool holding member, a bar carried by one of said extensions and having sliding engagement with the other so as to obtain a piloting effect and adapted to be stopped during the relative movement between the work and tool holding members, and a movement transmitting connection between the bar and tool supporting member to shift the latter while the work and tool holding members move toward each other after the stopping of the bar.

3. In a machine tool for boring or turning spherical surfaces, work and tool holding members one movable toward and from the other and each having an extension, a movable tool support carried by one extension, a bar carried by but slidably mounted in said extension and adapted to have sliding engagement with the other extension and adapted to be stopped during the relative movement of said work and tool holding members toward each other, and a link connection between the bar and movable tool support serving to shift the latter after the stopping of the bar.

4. In a machine tool for turning or boring spherical surfaces, work and tool holding members one movable toward and from the other and each carrying an extension, a movable tool support carried by the extension of the tool holding member, a bar carried by the same extension and having sliding engagement therewith, said bar having an adjustable member adapted to have sliding engagement with the other extension so as to obtain a piloting effect, and a movement transmitting connection between the bar and the movable tool support to shift the latter after the movement of the bar is stopped.

5. In a machine tool for boring or turning spherical surfaces, a work holding member, a tool holding member movable toward and from the same, the tool holding member having an extension with a slide movable at right angles to the axis of the machine, a bar carried by said extension and having sliding engagement therewith, and a link connection between the bar and the slide, the work holding member having an extension which slidingly receives the forward end of the bar and which stops the movement of the bar after a predetermined movement of the tool holding member toward the work holding member.

6. In a machine tool for boring or turning spherical surfaces, a work holding member, a tool holding member movable toward and from the same, the tool holding member having an extension with a slide, a bar carried by said extension and having sliding engagement therewith, and a link connection between the bar and the slide, the bar having an adjustable forward portion and the work holding member having an extension which slidingly receives the adjustable portion of the bar and which serves to stop the movement of the bar after a predetermined movement of the tool holding member toward the work holding member.

7. In a machine tool for boring or turning spherical surfaces, work and tool holding members one movable toward and from the other, the tool holding member having a slide carrying a bar slidably mounted therein, a link connected to the bar and to the slide, and an adjustable bearing for one end of the link.

8. In a machine tool for boring or turning spherical surfaces, work and tool holding members one movable toward and from the other, the tool holding member having a movable tool support and carrying a bar slidably mounted therein, a link connected to the bar and to the tool support, the latter carrying an adjustable bearing for the outer end of the link, and means for stopping the movement of the bar during relative movement between the work and tool holding members.

9. In a machine tool for boring or turning spherical surfaces, work and tool holding members one movable toward and from the other, the tool holding member having a movable tool support and carrying a bar slidably mounted therein, a link connected to the bar and to the tool support, the latter having an adjustable bearing member for the outer end of the link, said bearing member having an eccentric portion engaged by the link, and means for stopping the movement of the bar during relative movement between the work and tool holding members.

10. A machine tool for boring or turning spherical surfaces comprising work holding and tool holding members one movable toward and from the other, one of said members having a movable tool support and one carrying a slidable bar, an adjustable link between the bar and the slide, and an abutment for stopping the movement of the bar during relative movement between the work and tool holding members.

11. A machine tool for boring or turning spherical surfaces comprising work holding and tool holding members one movable toward and from the other, one of said members having a movable tool support and one carrying a slidable bar, an adjustable link between the bar and the slide, said link having an adjustable bearing at one end, and an abutment for stopping the movement of the bar during relative movement between the work and tool holding members.

12. A machine tool for boring or turning spherical surfaces comprising work holding and tool holding members one movable toward and from the other, one of said members having a movable tool support and one carrying a slidable bar, an adjustable link extending between the bar and the tool support, the latter having a bearing member with an eccentric portion engaged by the outer end of the link, and an abutment for stopping the movement of the bar during relative movement between the work and tool holding members.

13. In a machine tool, work and tool holding members one movable toward and from the other, the tool holding member having a laterally movable tool support and carrying a yieldingly supported member, an abutment for stopping the movement of said member during relative movement between the work and tool holding members, and a movable member connecting said yieldingly supported member to the tool support.

14. In a machine tool, work and tool holding members one movable toward and from the other, the tool holding member having a movable tool support and carrying a yieldingly supported member, an abutment for stopping the movement of said member during relative movement between the work and tool holding members, and a connection between the yieldingly supported member and the tool support for imparting to the latter an accelerated inward and outward movement so as to give the tool an arcuate movement.

15. In a machine tool, work and tool holding members one movable toward and from the other, the tool holding member having a movable tool support and carrying a yieldingly supported member, an abutment for stopping the movement of said member during relative movement between the work and tool holding members, and a link connecting the yieldingly supported member with the tool support.

16. In a machine tool, work and tool holding members one movable toward and from the other, a movable tool support carried by the tool holding member and movable inwardly and outwardly with reference to the axis of the machine, a bar slidingly supported by the tool holding member and having a connection with the tool support, an abutment for stopping the movement of the bar so that the tool holding member will move relative to the bar during relative movement between the work and tool holding members in one direction, and means for causing opposite relative movement between the tool holding member and the bar during relative movement between the work and tool holding members in the opposite directions.

17. In a machine tool, a work holding member, a tool holding member movable toward and from the former, a movable tool support movable laterally with reference to the axis of the machine, a bar slidingly supported by the tool holding member, an abutment for stopping the movement of the bar so that the tool holding member will move relative to the bar, a member connecting the bar to the tool support so as to move it laterally while the bar is stopped, and a spring which is compressed when the bar is stopped and serving to move the bar relative to the tool holding member when the latter is retracted from the work holder.

In testimony whereof, we hereunto affix our signatures.
JOHN J. N. VAN HAMERSVELD.
WILBUR C. DE GRAFF.
LESTER M. COLE.